US012649258B2

(12) United States Patent
Rocholl et al.

(10) Patent No.: US 12,649,258 B2
(45) Date of Patent: *Jun. 9, 2026

(54) MIXING DRUM

(71) Applicant: Oshkosh Corporation, Oshkosh, WI (US)

(72) Inventors: Josh Rocholl, Oshkosh, WI (US); Terry Tucke, Oshkosh, WI (US); Bryan Datema, Oshkosh, WI (US); Thomas Harris, Oshkosh, WI (US); Jillian Steffek, Oshkosh, WI (US); Bob Hathaway, Oshkosh, WI (US); Chadwick Johnson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/649,625

(22) Filed: Apr. 29, 2024

(65) Prior Publication Data

US 2024/0278459 A1 Aug. 22, 2024

Related U.S. Application Data

(63) Continuation of application No. 17/101,540, filed on Nov. 23, 2020, now Pat. No. 11,999,078, which is a
(Continued)

(51) Int. Cl.
*B28C 5/42* (2006.01)
*B01F 29/00* (2022.01)
(Continued)

(52) U.S. Cl.
CPC ...... *B28C 5/4272* (2013.01); *B01F 29/40111* (2022.01); *B01F 29/40221* (2022.01); *B01F 29/4033* (2022.01); *B01F 29/63* (2022.01); *B01F 33/5021* (2022.01); *B28C 5/1862* (2013.01); *B28C 5/4268* (2013.01); *B01F 29/40231* (2022.01); *B01F 29/60* (2022.01);
(Continued)

(58) Field of Classification Search
CPC .... B28C 5/1862; B28C 5/4268; B28C 5/4272
USPC .............................. 366/44, 57, 59, 227, 228
See application file for complete search history.

(56) References Cited

U.S. PATENT DOCUMENTS

| | | | |
|---|---|---|---|
| 1,867,838 A | 7/1932 | Jaeger |
| 1,928,380 A | 9/1933 | Gebhard |
| | (Continued) | | |

OTHER PUBLICATIONS

Partial Search Report on Application No. PCT/US2018/052412, dated Feb. 22, 2019, 13 pages.
(Continued)

*Primary Examiner* — David L Sorkin
(74) *Attorney, Agent, or Firm* — Foley & Lardner LLP

(57) ABSTRACT

A mixing drum includes a body defining a discharge aperture, a head coupled to the body opposite the discharge aperture, and a mixing element. The body includes an inner layer defining an interior surface of the body and an outer layer defining an exterior surface of the body. The head includes a connecting flange extending between the inner layer and the outer layer of the body. The head and the body define a volume. The mixing element is positioned within the volume and coupled to the body.

20 Claims, 10 Drawing Sheets

Related U.S. Application Data continuation of application No. 16/139,746, filed on Sep. 24, 2018, now Pat. No. 10,843,379.

(60) Provisional application No. 62/562,782, filed on Sep. 25, 2017.

(51) Int. Cl.

| | |
|---|---|
| *B01F 29/63* | (2022.01) |
| *B01F 33/502* | (2022.01) |
| *B28C 5/18* | (2006.01) |
| *B01F 29/60* | (2022.01) |
| *B01F 35/511* | (2022.01) |
| *B28C 5/08* | (2006.01) |
| *B60P 3/16* | (2006.01) |

(52) U.S. Cl.
CPC ........... *B01F 35/511* (2022.01); *B28C 5/0806* (2013.01); *B60P 3/16* (2013.01)

(56) References Cited

U.S. PATENT DOCUMENTS

| | | | | |
|---|---|---|---|---|
| 2,413,094 | A | * | 12/1946 | Yost ........................ F42B 33/14 |
| | | | | 366/227 |
| 3,232,586 | A | * | 2/1966 | McClive ............. B01F 35/3206 |
| | | | | 280/495 |
| 4,756,623 | A | * | 7/1988 | Bishop .................... B01F 29/40 |
| | | | | 366/233 |
| 5,056,924 | A | | 10/1991 | Christenson |
| 5,178,457 | A | | 1/1993 | Helmy |
| 5,427,449 | A | | 6/1995 | Christenson et al. |
| 5,697,741 | A | | 12/1997 | Harris et al. |
| 5,765,624 | A | | 6/1998 | Hathaway et al. |
| 5,779,300 | A | | 7/1998 | McNeilus et al. |
| 5,785,486 | A | | 7/1998 | McNeilus et al. |
| 5,785,487 | A | | 7/1998 | McNeilus et al. |
| 5,813,818 | A | | 9/1998 | McNeilus et al. |
| 5,868,543 | A | | 2/1999 | McNeilus et al. |
| 5,885,049 | A | | 3/1999 | McNeilus et al. |
| 6,210,094 | B1 | | 4/2001 | McNeilus et al. |
| 6,578,694 | B2 | | 6/2003 | Harris et al. |
| 7,489,098 | B2 | | 2/2009 | Harris et al. |
| 7,578,379 | B2 | | 8/2009 | Gillmore et al. |
| 7,648,015 | B2 | | 1/2010 | Gillmore et al. |
| 7,683,564 | B2 | | 3/2010 | Harris et al. |
| 7,850,364 | B2 | | 12/2010 | Harris et al. |
| 7,931,397 | B2 | | 4/2011 | Lindblom et al. |
| 7,963,204 | B2 | | 6/2011 | Venton-Walters et al. |
| 8,070,348 | B2 | | 12/2011 | Khouri |
| 8,070,349 | B2 | | 12/2011 | Khouri |
| 8,162,529 | B2 | | 4/2012 | Khouri et al. |
| 8,287,173 | B2 | | 10/2012 | Khouri |
| 8,613,543 | B2 | | 12/2013 | Lindblom et al. |
| 8,646,965 | B2 | | 2/2014 | Datema et al. |
| 8,794,886 | B1 | | 8/2014 | Nett et al. |
| D737,866 | S | | 9/2015 | Datema et al. |
| D772,306 | S | | 11/2016 | Datema et al. |
| 9,694,671 | B2 | | 7/2017 | Wildgrube et al. |
| 10,239,403 | B2 | | 3/2019 | Broker et al. |
| 10,843,379 | B2 | * | 11/2020 | Rocholl ........... B01F 29/40111 |
| 2006/0152997 | A1 | | 7/2006 | Khouri et al. |
| 2006/0167140 | A1 | | 7/2006 | Altounian et al. |
| 2017/0297425 | A1 | | 10/2017 | Wildgrube et al. |
| 2017/0361491 | A1 | | 12/2017 | Datema et al. |
| 2018/0250847 | A1 | | 9/2018 | Wurtz et al. |
| 2019/0091890 | A1 | | 3/2019 | Rocholl et al. |

OTHER PUBLICATIONS

International Search Report and Written Opinion Received for Application No. PCT/US2018/052412, Oshkosh Corporation, Apr. 12, 2019, 20 pp.
International Preliminary Report on Patentability for PCT/US2018/052412 dated Apr. 9, 2020 (12 pages).

* cited by examiner

MIXING DRUM

CROSS-REFERENCE TO RELATED PATENT APPLICATIONS

This application is a continuation of U.S. patent application Ser. No. 17/101,540, filed Nov. 23, 2020, which is a continuation of U.S. patent application Ser. No. 16/139,746, filed Sep. 24, 2018, now U.S. Pat. No. 10,843,379, which claims the benefit of U.S. Provisional Patent Application No. 62/562,782, filed Sep. 25, 2017, all of which are incorporated herein by reference in their entireties.

BACKGROUND

Concrete mixing trucks have a limited ability to carry large volumes of concrete. Concrete mixing trucks are often used to transport large volumes of concrete to various building sites. The concrete mixing trucks include rotatable mixing drums that contain the concrete. The mixing drums include mixing elements that mix the concrete, preventing it from setting prematurely. Certain regulatory bodies have placed limitations on the concrete mixers that limit the overall weight of the drum and the concrete inside. Consequently, these limitations also limit the amount of concrete that can be carried by the concrete mixing trucks at one time. As the capacity of a concrete mixing truck decreases, it requires a greater number of trips to and from the building site to complete a construction job, increasing the cost and duration of the construction job.

SUMMARY

One embodiment relates to a mixing drum including a body defining a discharge aperture, a head coupled to the body opposite the discharge aperture, and a mixing element. The body includes an inner layer defining an interior surface of the body and an outer layer defining an exterior surface of the body. The head includes a connecting flange extending between the inner layer and the outer layer of the body. The head and the body define a volume. The mixing element is positioned within the volume and coupled to the body.

Another embodiment relates to a mixing drum including a body defining a head aperture and a discharge aperture opposite the head aperture, a head coupled to the body and positioned such that the head extends across the head aperture, and a mixing element. The body includes a first material. The head includes a second material different from the first material. The head and the body define a volume. The mixing element is positioned within the volume and coupled to the body. A density of the second material is greater than a density of the first material. At least one of (a) the first material is not present in the head or (b) the second material is not present in the body.

Yet another embodiment relates to a mixing drum including a body defining a head aperture and a discharge aperture opposite the head aperture, a head coupled to the body and positioned such that the head extends across the head aperture, and a mixing element. The body includes a first section including a protrusion and a second section defining a recess that receives the protrusion. The head and the body define a volume, and the mixing element is positioned within the volume and coupled to the body.

The invention is capable of other embodiments and of being carried out in various ways. Alternative exemplary embodiments relate to other features and combinations of features, as may be recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a concrete mixing truck includes a mixing drum configured to rotate relative to the rest of the concrete mixing truck. The mixing drum includes a body defining a discharge aperture, a head coupled to an end of the body opposite the discharge aperture, and a series of mixing elements. The head and the body define a volume in which material is contained. The mixing elements are arranged in the volume such that the material is mixed when the mixing drum is rotated in one direction and moved out of the discharge aperture when the mixing drum is rotated in the opposing direction. The body is made of a composite material, and the head is made of a material more dense than the composite material (e.g., steel). This facilitates a low center of gravity, as the head is disposed near the bottom of the mixing drum. The mixing drum is lighter when compared to a conventional steel drum, facilitating carrying a larger volume of material when the drum is loaded to a given weight. The mixing elements are removably coupled (e.g., bonded and/or mechanically fastened) to the body, facilitating removal of the mixing elements from the mixing drum for replacement or service, increasing the working life of the mixing drum.

Concrete Mixing Truck

Figure 1:
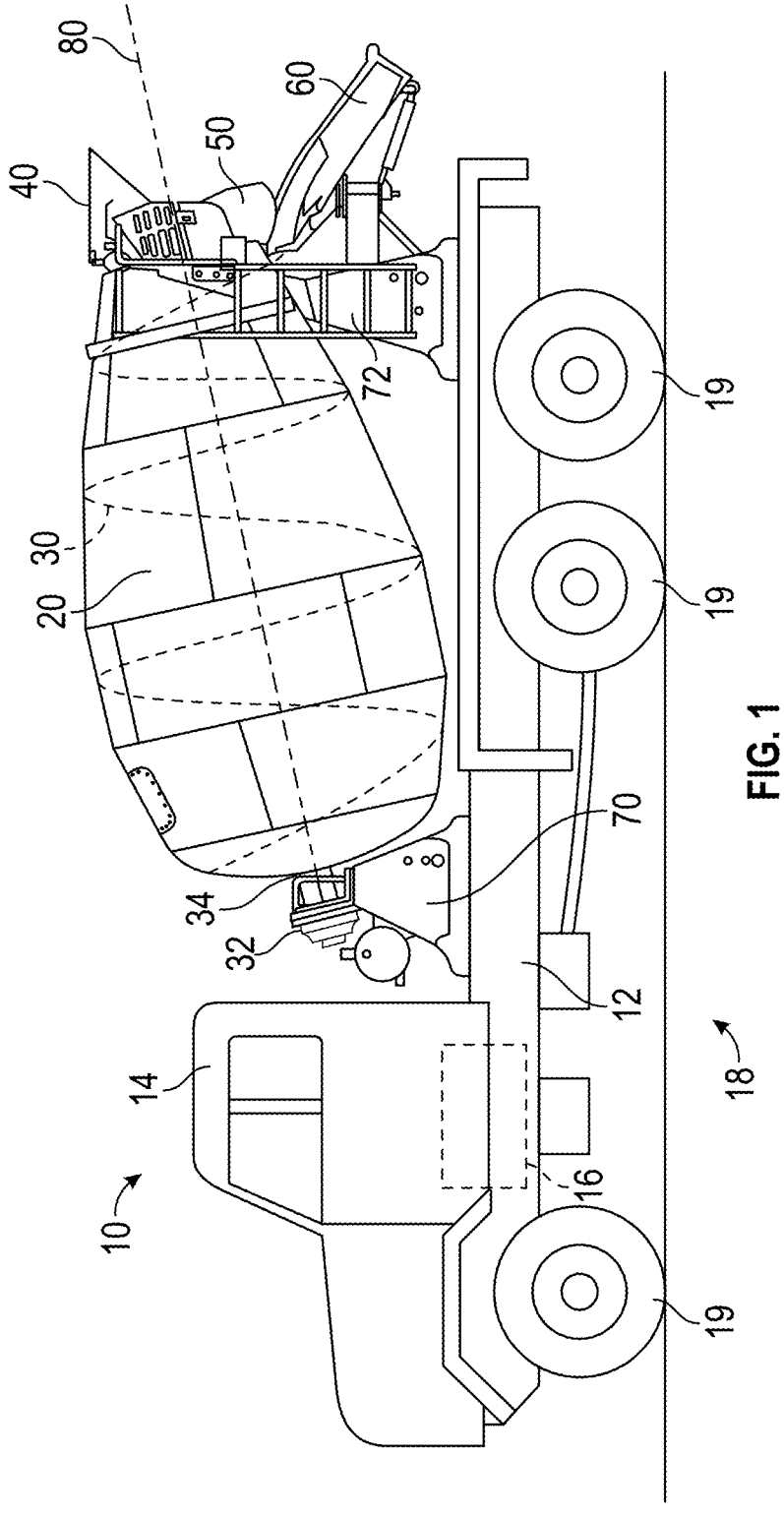
FIG. 1 is a schematic diagram of a concrete mixing truck, according to an exemplary embodiment.
Figure 2:
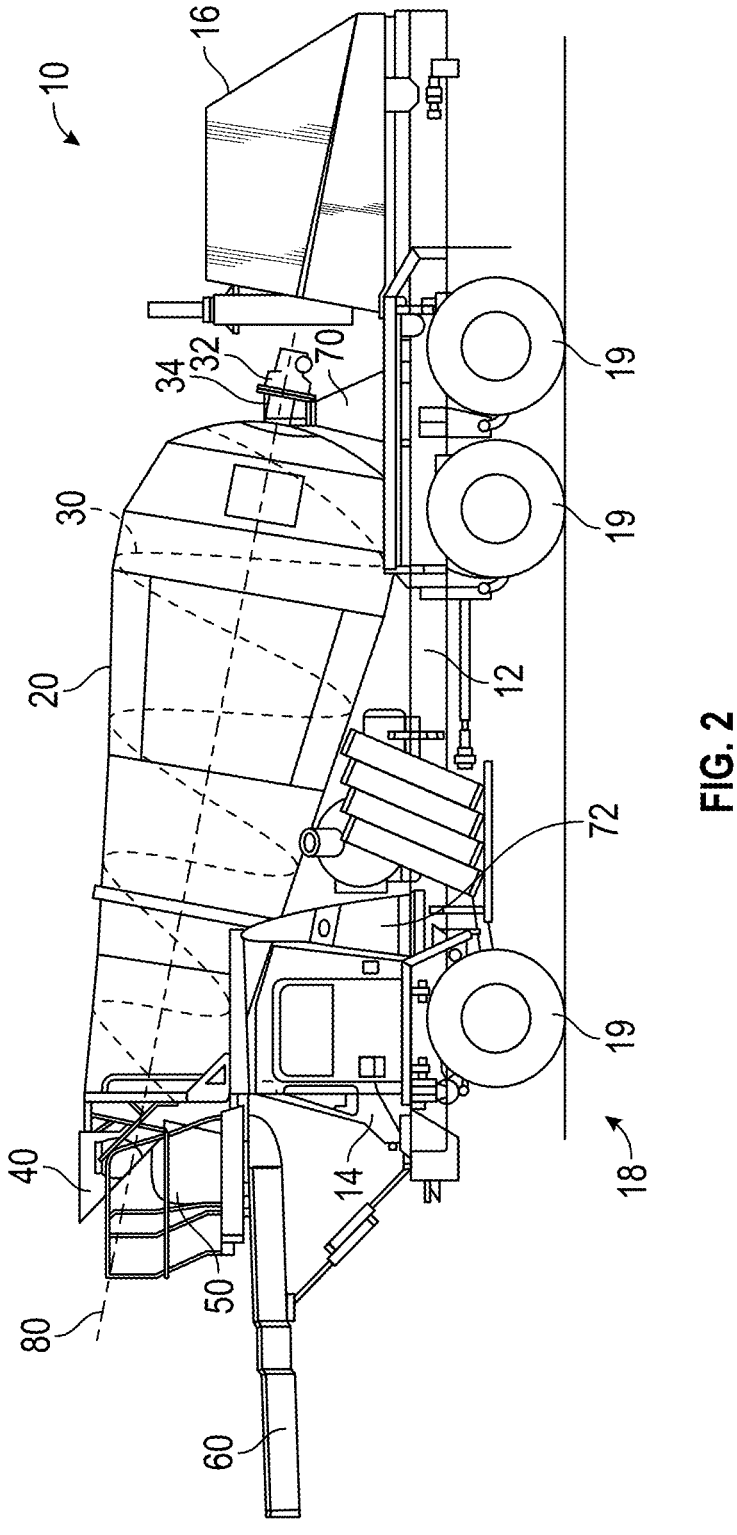
FIG. 2 is a schematic diagram of concrete mixing truck, according to another exemplary embodiment.

According to the exemplary embodiments shown in FIGS. 1 and 2, a vehicle, shown as a concrete mixing truck 10, includes a drum assembly, shown as a mixing drum 20. As shown in FIG. 1, the concrete mixing truck 10 is configured as a rear-discharge concrete mixing truck. In other embodiments, such as the embodiment shown in FIG. 2, the concrete mixing truck 10 is configured as a front-discharge concrete mixing truck. As shown in FIG. 1, the concrete mixing truck 10 includes a chassis, shown as frame 12, and a cabin, shown as cab 14, coupled to the frame 12 (e.g., at a front end thereof, etc.). The mixing drum 20 is coupled to the frame 12 and disposed behind the cab 14 (e.g., at a rear end thereof, etc.), according to the exemplary embodiment shown in FIG. 1. In other embodiments, such as the embodiment shown in FIG. 2, at least a portion of the mixing drum 20 extends beyond the front of the cab 14. The cab 14 may include various components to facilitate operation of the concrete mixing truck 10 by an operator (e.g., a seat, a steering wheel, hydraulic controls, a control panel, a control device, a user interface, switches, buttons, dials, etc.).

The concrete mixing truck 10 also includes an engine 16. For example, the engine 16 may be coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the engine 16 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 10.

The concrete mixing truck 10 may also include a transmission that is coupled to the engine 16. The engine 16 produces mechanical power (e.g., due to a combustion reaction, etc.) that may flow into the transmission. The concrete mixing truck 10 may include a vehicle drive system 18 that is coupled to the engine 16 (e.g., through the transmission). The vehicle drive system 18 may include drive shafts, differentials, and other components coupling the transmission with a ground surface to move the concrete mixing truck 10. The concrete mixing truck 10 may also include a plurality of tractive elements, shown as wheels 19, that engage a ground surface to move the concrete mixing truck 10. In one embodiment, at least a portion of the mechanical power produced by the engine 16 flows through the transmission and into the vehicle drive system 18 to power at least some of the wheels 19 (e.g., front wheels, rear wheels, etc.). In one embodiment, energy (e.g., mechanical energy, etc.) flows along a power path defined from the engine 16, through the transmission, and to the vehicle drive system 18.

As shown in FIGS. 1 and 2, the mixing drum 20 includes a mixing element (e.g., fins, etc.), shown as a mixing element 30, positioned within the interior (e.g., an internal volume) of the mixing drum 20. The mixing element 30 may be configured to (i) mix the contents of mixture within the mixing drum 20 when the mixing drum 20 is rotated (e.g., by a drum drive system) in a first direction (e.g., counterclockwise, clockwise, etc.) and (ii) drive the mixture within the mixing drum 20 out of the mixing drum 20 (e.g., through a chute, etc.) when the mixing drum 20 is rotated (e.g., by a drum drive system including a drum driver 32) in an opposing second direction (e.g., clockwise, counterclockwise, etc.). The concrete mixing truck 10 also includes an inlet (e.g., hopper, etc.), shown as charge hopper 40, a connecting structure, shown as discharge hopper 50, and an outlet, shown as chute 60. The charge hopper 40 is fluidly coupled with the mixing drum 20, which is fluidly coupled with the discharge hopper 50, which is fluidly coupled with the chute 60. In this way, wet concrete may flow into the mixing drum 20 from the charge hopper 40 and may flow out of the mixing drum 20 into the discharge hopper 50 and then into the chute 60 to be dispensed. According to an exemplary embodiment, the mixing drum 20 is configured to receive a mixture, such as a concrete mixture (e.g., cementitious material, aggregate, sand, rocks, etc.), through the charge hopper 40.

The drum driver 32 is configured to provide mechanical energy (e.g., in a form of an output torque) to rotate the mixing drum 20. The drum driver 32 may be a hydraulic motor, an electric motor, a power take off shaft coupled to the engine 16, or another type of driver. The drum driver 32 is coupled to the mixing drum 20 by a shaft, shown as drive shaft 34. The drive shaft 34 is configured to transfer the output torque to the mixing drum 20.

Figure 3:
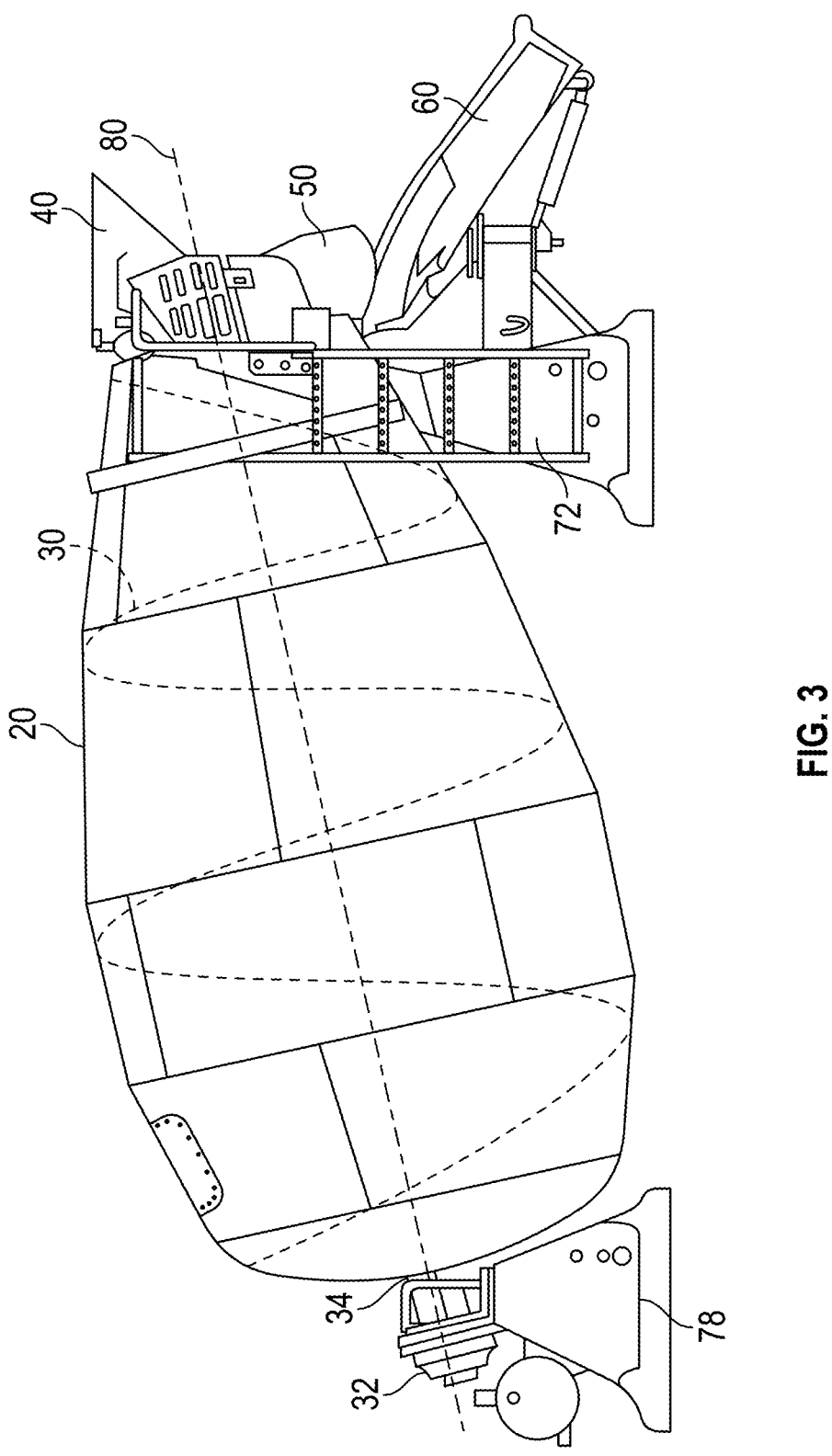
FIG. 3 is a schematic diagram of a mixing drum for a concrete mixing truck, according to an exemplary embodiment.

FIG. 3 illustrates the mixing drum 20, the mixing element 30, the drum driver 32, the charge hopper 40, the discharge hopper 50, and the chute 60 isolated from the concrete mixing truck 10. The mixing drum 20 may be coupled to supports (e.g., pedestals, etc.), shown as pedestal 70 and pedestal 72. The pedestal 70 and the pedestal 72 may be coupled to the frame 12 of the concrete mixing truck 10. The pedestal 70 and the pedestal 72 may function to cooperatively couple (e.g., attach, secure, etc.) the mixing drum 20 to the frame 12 and facilitate rotation of the mixing drum 20 relative to the frame 12. In an alternative embodiment, such as is shown in FIG. 3, the mixing drum 20 is configured as a stand-alone mixing drum that is not coupled (e.g., fixed, attached, etc.) to a vehicle. In such an embodiment, the mixing drum 20 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIG. 1, the mixing drum 20 defines a central, longitudinal axis 80. According to an exemplary embodiment, the mixing drum 20 is selectively rotated about the longitudinal axis 80 (e.g., by the drum driver 32). The longitudinal axis 80 may be angled relative to the frame (e.g., the frame 12 of the concrete mixing truck 10) such that the longitudinal axis 80 intersects with the frame. For example, the longitudinal axis 80 may be elevated from the frame at an angle in the range of five degrees to twenty degrees. In other applications, the longitudinal axis 80 may be elevated by less than five degrees (e.g., four degrees, three degrees, etc.) or greater than twenty degrees (e.g., twenty-five degrees, thirty degrees, etc.). In an alternative embodiment, the concrete mixing truck 10 includes an actuator positioned to facilitate selectively adjusting the longitudinal axis 80 to a desired or target angle (e.g., manually in response to an operator input/command, automatically according to a control scheme, etc.).

Mixing Drum

Figure 4:
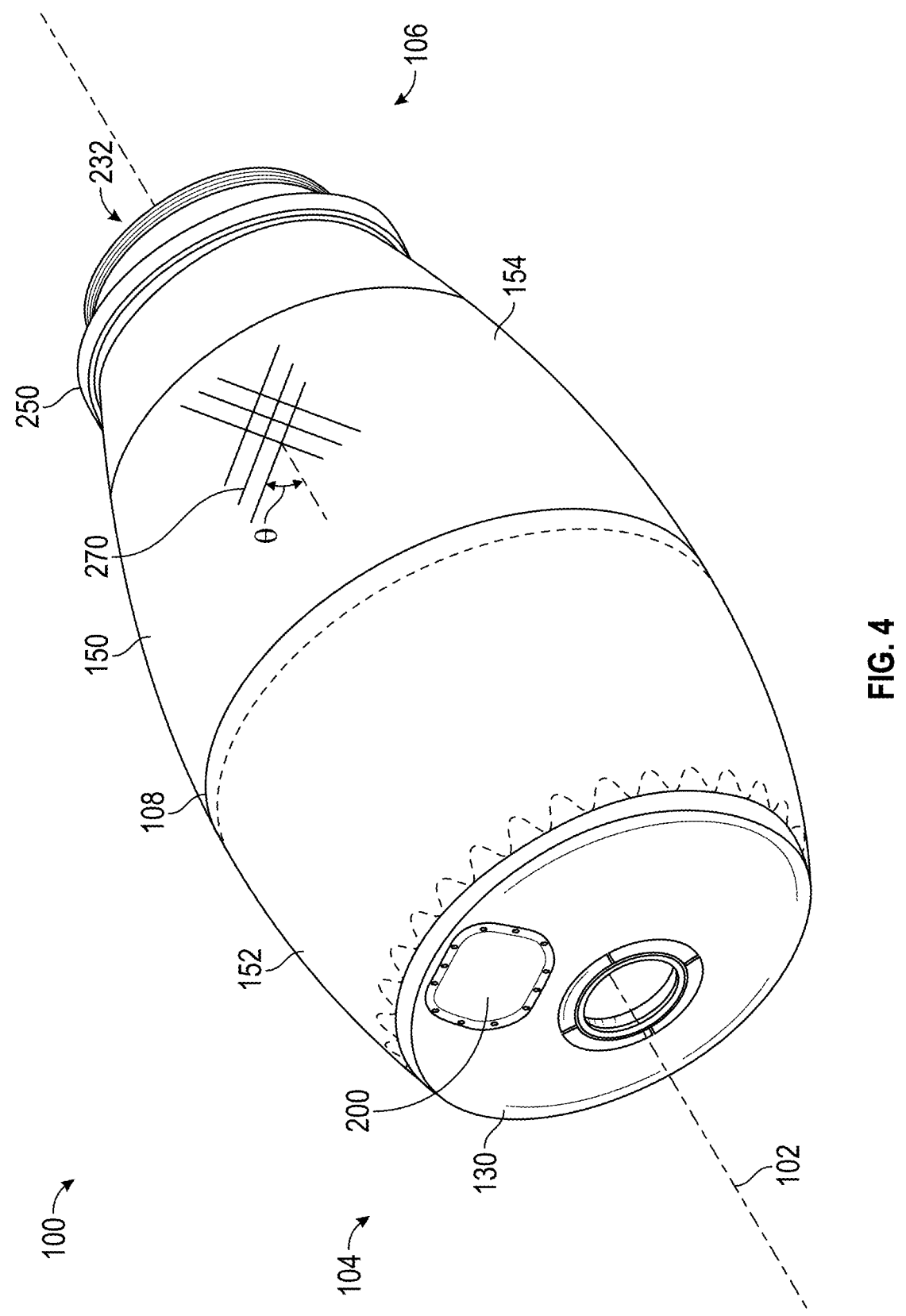
FIG. 4 is a perspective view of a mixing drum, according to an exemplary embodiment.

Referring to FIG. 4 a drum assembly is shown as a mixing drum 100. The mixing drum 100 may be substantially similar to the mixing drum 20 (e.g., may be used within the concrete mixing truck 10). The mixing drum 100 is config- ured to rotate about a longitudinal axis 102 that extends through the center of the mixing drum 100. The longitudinal axis 102 runs from a head end 104 of the mixing drum 100 to a discharge end 106. Between the head end 104 and the discharge end 106, the diameter of the cross section of the mixing drum 100 generally increases, then decreases. The diameter of the cross section is largest at a point 108 disposed between the head end 104 and the discharge end 106. In some embodiments, the point 108 is closer to the head end 104 than the discharge end 106. This facilitates maintaining a low center of gravity of the mixing drum 100 when the longitudinal axis 102 is elevated relative to a horizontal plane, as it increases the volume of mixture that may be stored in the lowest portion of the mixing drum 100.

Figure 5:
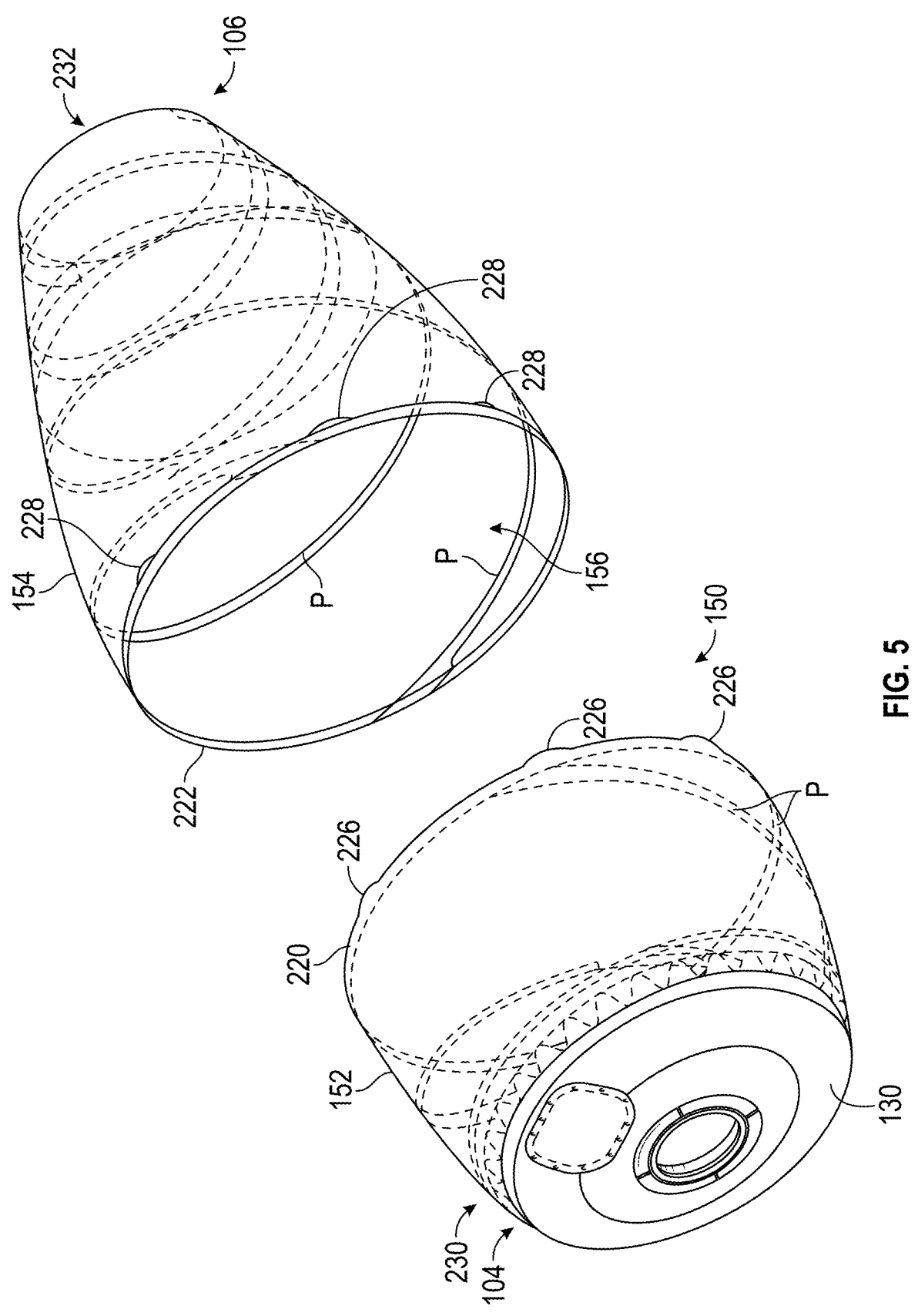
FIG. 5 is an exploded view of the mixing drum of FIG. 4.

Referring to FIGS. 4 and 5, the mixing drum 100 includes a head 130 and a body 150. The head 130 is coupled to the body 150 at the head end 104 of the mixing drum 100. In some embodiments, the body 150 is made up of multiple parts. As shown in FIG. 5, the body 150 includes a first section or part, shown as head portion 152, and a second section or part, shown as discharge portion 154. The head portion 152 and the discharge portion 154 are coupled to form the body 150. In some embodiments, the head portion 152 and the discharge portion 154 are coupled proximate the point 108. Additionally or alternatively, the body 150 may be split longitudinally (i.e., such that the seams between the portions of the body 150 extend longitudinally). By way of example, the body 150 may be split into two longitudinal sections. In yet other embodiments, the body 150 is made up of one singular piece. The head 130 and the body 150 define a volume 156 (e.g., an internal volume) that can be used to contain the mixture (e.g., wet concrete). The connections between the head 130, the head portion 152, and the discharge portion 154 may substantially seal the mixing drum 100 to prevent mixture leaking through to the exterior of the mixing drum 100.

Figures 6, 7:
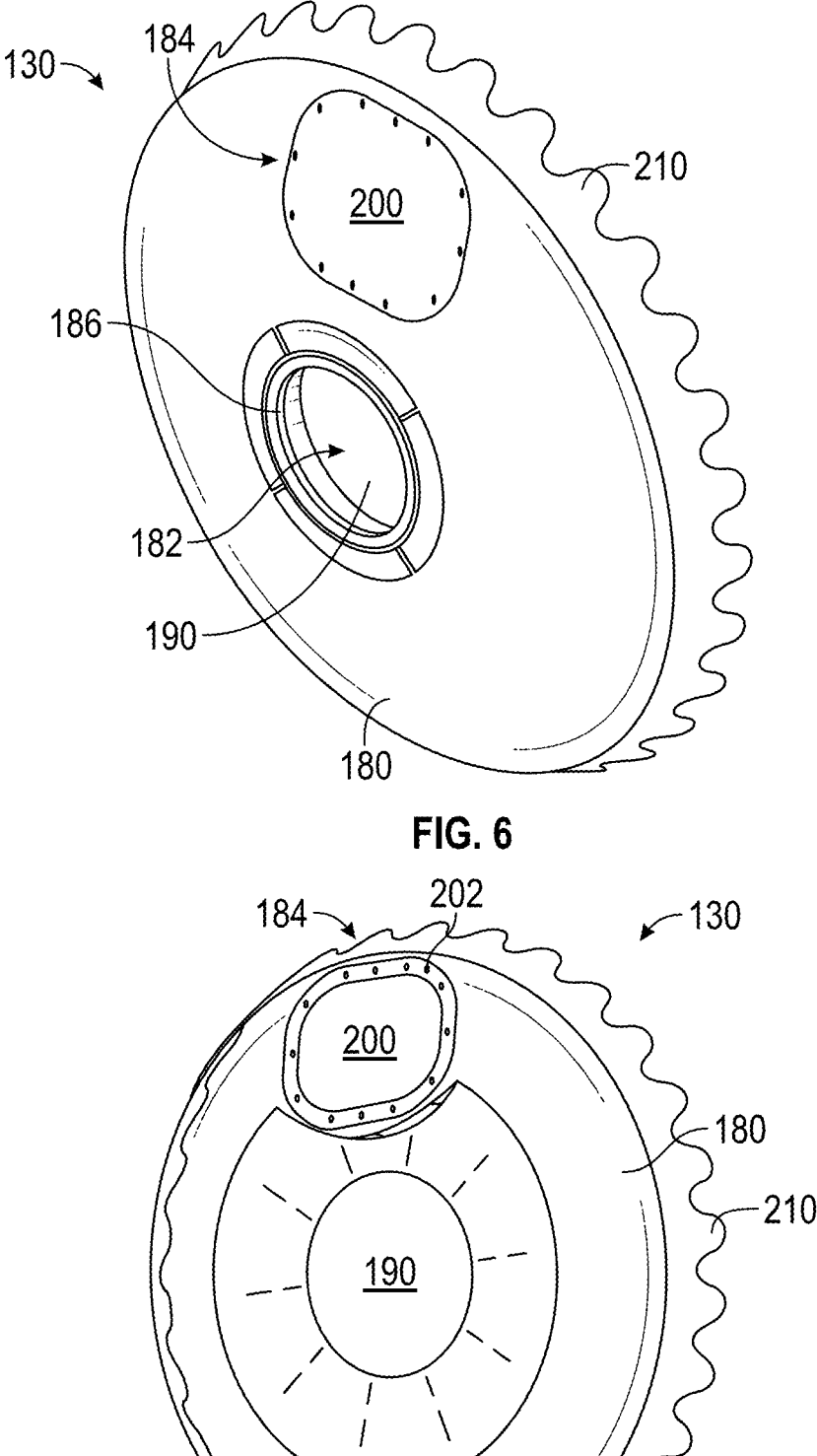
FIG. 6 is a front perspective view of a head of the mixing drum of FIG. 4, according to an exemplary embodiment.
FIG. 7 is rear perspective view of the head of FIG. 6.

Referring to FIGS. 6 and 7, the head 130 includes a main body, shown as plate 180. The plate 180 defines a first aperture, shown as drive aperture 182, and a second aperture, shown as hatch aperture 184. The drive aperture 182 is configured to receive a drive shaft (e.g., the drive shaft 34) from a driver (e.g., the drum driver 32). The driver may be a component of the concrete mixing truck 10 (e.g., the engine of the concrete mixing truck 10 delivering power through a power take off shaft) or may otherwise be a standalone driver. The driver may be any type of engine (e.g., internal combustion), motor (e.g., electric, hydraulic), or other type of driver. The drive shaft operatively couples the head 130 to the driver such that the driver may selec- tively rotate the mixing drum 100 about the longitudinal axis 102. The plate 180 may include a boss, shown as drive flange 186, surrounding the drive aperture 182. The drive flange 186 may increase the strength of the head 130 and may be specifically shaped to facilitate power transmission from the drive shaft. By way of example, the drive aperture 182 may be shaped such that the drive flange 186 interlocks with the drive shaft to prevent relative rotation between the drive shaft and the head 130. Coupled to the interior of the head 130 is a head dish 190. The head dish 190 may be mainly circular with a portion cut away around the hatch aperture 184. In some embodiments, the head dish 190 seals the area surrounding the drive aperture 182 such that fluid communication between the volume inside the mixing drum 100 and the drive aperture 182 is prevented. In some embodiments, the drive shaft seals around the drive aperture 182. In some embodiments, the drive flange 186 seals against the plate 180 and/or the head dish 190. As shown in FIG. 13, a series of ribs 192 may extend between the head dish 190 and the plate 180, strengthening the head dish 190.

Referring again to FIGS. 6 and 7, the hatch aperture 184 is selectively covered by a plate, shown as hatch plate 200, located on the exterior of the head 130. A flange, shown as hatch surround 202, may be coupled to the plate 180 surrounding the hatch aperture 184. The hatch surround 202 may define a series of apertures (e.g., threaded apertures, etc.) such that the hatch plate 200 may be fastened to and removed from the plate 180 without requiring access to the interior of the mixing drum 100. When fastened to the plate 180, the hatch plate 200 and the hatch surround 202 seal the hatch aperture 184. The hatch plate 200 facilitates access to the interior of the mixing drum 100 from the head end 104. By way of example, an operator may remove the hatch plate 200 and insert a spray nozzle through the hatch aperture 184 to spray water, cleaning the interior of the mixing drum 100. By way of another example, an operator may remove the hatch plate 200 and view the interior of the mixing drum 100 to determine if there is a need for maintenance. A connecting flange 210 extends from an outer edge of the plate 180. The connecting flange 210 may extend inside of the body 150. As shown in FIGS. 6 and 7, the connecting flange 210 has a curved oscillatory edge. The shape of this edge may strengthen the connection between the connecting flange 210 and the body 150.

Referring to FIG. 5, the head portion 152 of the body 150 includes a connecting flange 220, and the discharge portion 154 includes a connecting flange 222. The connecting flange 222 may be have a smaller diameter than the connecting flange 220 such that the connecting flange 222 can be received within the connecting flange 220 when the body 150 is assembled. Further, the head portion 152 includes protrusions 226 arranged around the circumference of the body 150 extending away from the head end 104. The discharge portion 154 defines recesses 228 configured to receive the protrusions 226. In other embodiments, the connecting flange 220 is received by the connecting flange 222, the protrusions 226 extend from the discharge portion 154, and/or the recesses 228 are defined by the head portion 152. The protrusions 226 and the recesses 228 may facilitate angularly aligning the head portion 152 and the discharge portion 154 when assembling the body 150. By way of example, the protrusions 226 and the recesses 228 may be spaced irregularly such that the body 150 may only be assembled with the head portion 152 and the discharge portion 154 in one orientation. By way of another example, the protrusions 226 and the recesses 228 may be spaced regularly such that the body 150 may only be assembled with the head portion 152 and the discharge portion 154 in a finite number of orientations. The cross sectional diameter of the head portion 152 decreases towards the head end 104, terminating in a head aperture 230 that receives the head 130. The cross sectional diameter of the discharge portion 154 decreases towards the discharge end 106, terminating in a discharge aperture 232. Mixture may be added to or removed from the mixing drum 100 through the discharge aperture 232.

Figure 8:
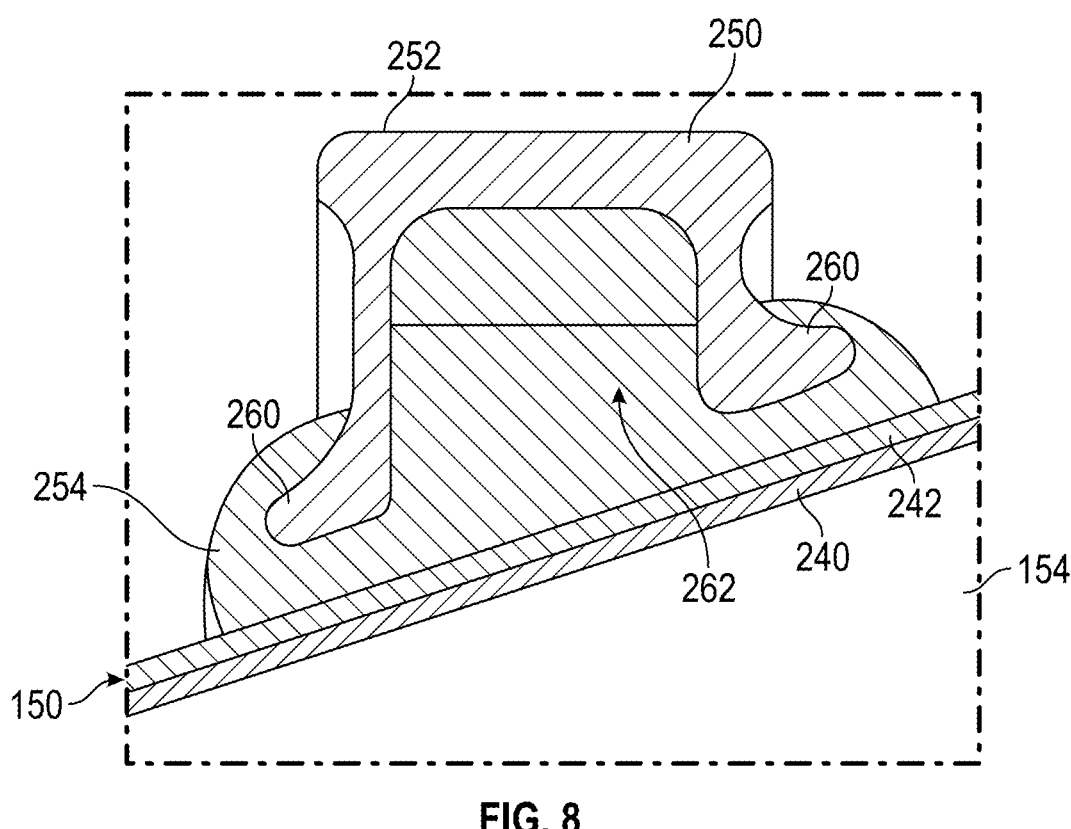
FIG. 8 is a cross sectional view of a roller track of the mixing drum of FIG. 4, according to an exemplary embodiment.
Figure 9:
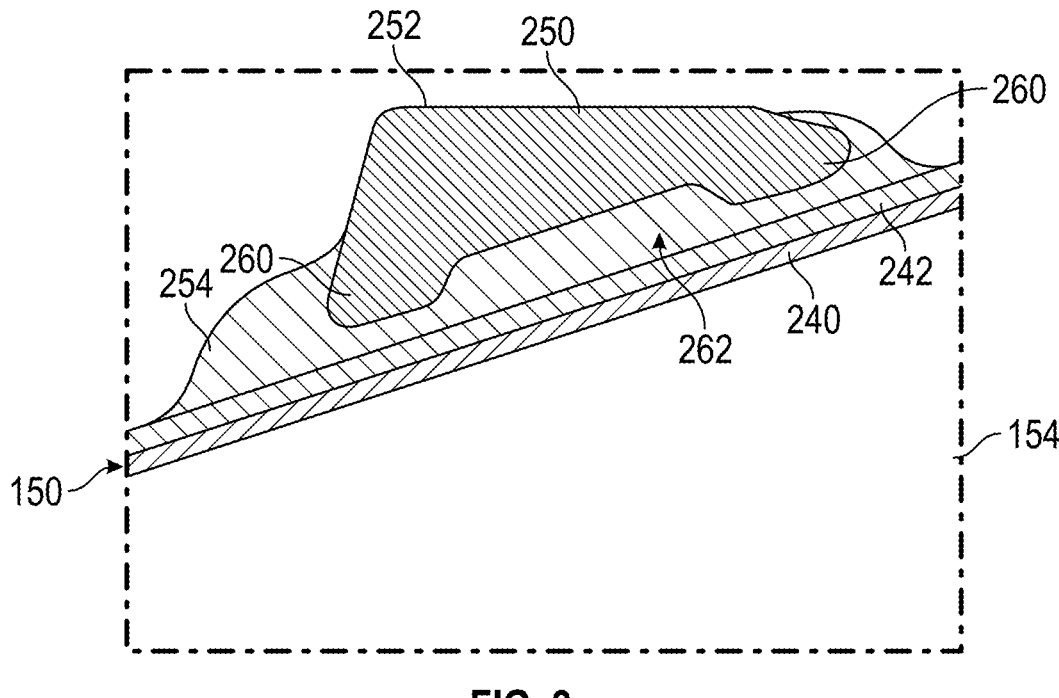
FIG. 9 is a cross sectional view of a roller track of the mixing drum of FIG. 4, according to another exemplary embodiment.
Figures 13A, 13B:
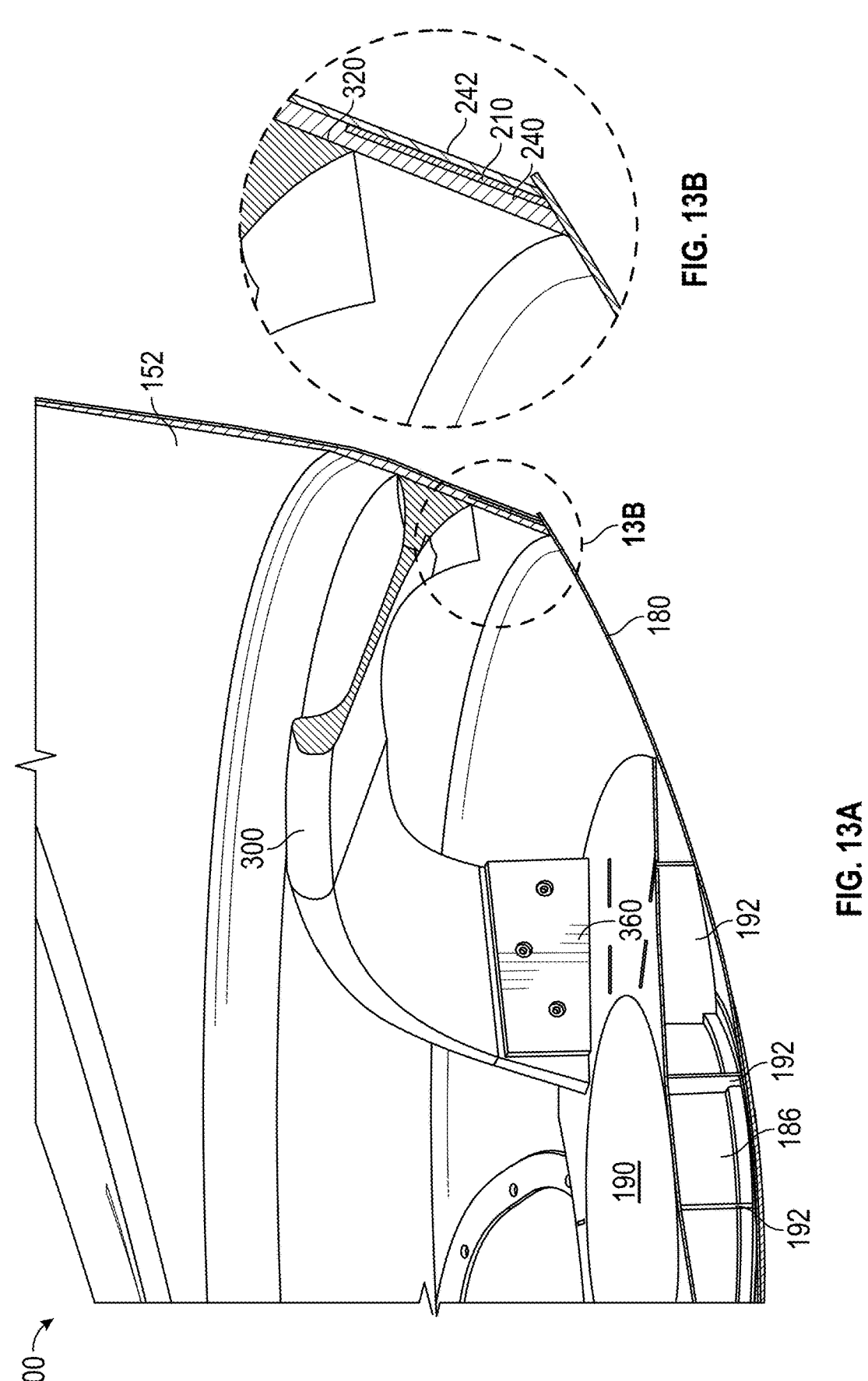
FIG. 13A is another cross sectional view of the mixing drum of FIG. 4.
FIG. 13B is a detail view of the mixing drum of FIG. 4.

Referring to FIGS. 6, 8, and 9, the body 150 may be made from multiple layers (e.g., two, four, ten, etc.). Specifically, the body 150 includes a first layer, shown as inner layer 240, and a second layer, shown as outer layer 242. The inner layer 240 is the innermost layer and defines an interior surface of the body 150. The outer layer 242 is the outermost layer and defines an exterior surface of the body 150. The inner layer 240 is coupled to the outer layer 242 (e.g., directly, indirectly through one or more intermediate layers, using adhesive, etc.). The connecting flanges 220 and 222 of the head portion 152 and the discharge portion 154 may be formed in the same layers or in different layers than the protrusions 226 and the recesses 228. By way of example, the connecting flange 220, the recesses 228, and the protrusions 226 may be formed in the outer layer 242, and the connecting flange 222 may be formed in the inner layer 240. The portion of the inner layer 240 in the head portion 152 may be shorter than (e.g., offset longitudinally from) the portion of the outer layer 242 in the head portion 152 to receive the connecting flange 222. This arrangement facilitates a significant amount of overlapping area between the head portion 152 and the discharge portion 154, facilitating a strong connection between the portions. As shown in FIGS. 13A and 13B, the connecting flange 210 of the head 130 may be received between the inner layer 240 and the outer layer 242 within the head portion 152. In other embodiments, the connecting flange 210 is located on the inside or the outside of the head portion 152.

Referring to FIGS. 4, 8, and 9, a bearing member is shown as a roller track 250. The roller track 250 encircles the body 150, defining a bearing surface 252 with which to support the weight of the mixing drum 100 and the weight of mixture in the mixing drum 100. The bearing surface 252 encircles the body 150 to facilitate supporting the mixing drum 100 as it rotates. The bearing surface 252 may rest upon two or more points of contact (e.g., the pedestal 72). These points of contact hold the mixing drum 100 in place laterally and vertically. In some embodiments, the points of contact are bearings to facilitate uninhibited rotation of the mixing drum 100. The roller track 250 may be hardened to prevent wear from repeated contact with the contact points. The roller track 250 is coupled to an interface member 254, that is in turn coupled to the discharge portion 154 of the body 150. The interface member 254 provides additional surface area with which to bond the roller track 250 to the body 150. In some embodiments, the interface member 254 surrounds a portion of the roller track 250 such that the roller track 250 and the interface member 254 are fixed relative to one another. By way of example, the roller track 250 may form a flange portion 260 on either side of the roller track 250 and a define a recess 262 in the center of the roller track 250. The interface member 254 surrounds the flange portions 260 and enters the recess 262 to form a strong connection between the roller track 250 and the interface member 254. In other embodiments, the roller track 250 and the interface member 254 are formed from a single piece. The interface member 254 and the roller track 250 may be shaped such that the bearing surface 252 maintains a specific orientation. By way of example, the bearing surface may be oriented parallel to the longitudinal axis 102, accounting for the slope of the exterior surface of the discharge portion 154. By way of another example, the bearing surface 252 may be oriented perpendicular to the direction of gravity, accounting for the slope of the exterior surface of the discharge portion 154 and the elevation of the longitudinal axis 102.

As shown in FIGS. 8 and 9, the discharge portion 154 of the body 150 is oriented such that the longitudinal axis 102 shown in FIG. 5 would appear as a horizontal line located below the section of the discharge portion 154 that is shown. When comparing the embodiment of the roller track 250 shown in FIG. 8 to the embodiment of the roller track 250 shown in FIG. 9, the roller track 250 shown in FIG. 9 maintains the bearing surface 252 while having a lower profile than the roller track 250 shown in FIG. 8. In FIG. 8, the bearing surface 252 is a significant distance farther from the longitudinal axis 102 than the interface member 254. In FIG. 9, the bearing surface 252 is approximately the same distance from the longitudinal axis 102 as the interface member 254.

Referring to FIG. 4, the body 150 is made from (e.g., is made entirely from, is made primarily from) a composite material. In some embodiments, the composite material includes woven fibers (e.g., E-glass, carbon filaments, etc.) embedded in a binding agent (e.g., urethane, epoxy, etc.). A section of the fibers are shown in FIG. 4 as fibers 270. The fibers 270 may be woven approximately perpendicular to one another. The fibers may be oriented at an angle $\theta$ relative to a line extending longitudinally along the exterior surface of the body 150. The angle $\theta$ may be approximately 45 degrees. In other embodiments, multiple layers of fibers are used such that the fibers extend in many different directions. The composite material is durable and lighter than materials conventionally used in concrete mixing drums (e.g., steel). In some embodiments, all of the layers making up the body 150 (e.g., the inner layer 240 and the outer layer 242) are made from the same material. In some embodiments, some of the layers are made using different materials (e.g., composites with different types of fibers 270) and/or are covered in different coatings. By way of example, an inner layer (e.g., the inner layer 240) may be made from a material or coated in a material that is resistant to abrasion. By way of another example, an outer layer may (e.g., the outer layer 242) be made from a material or coated in a material that is a certain color (e.g., paint) or that is resistant to damage from sunlight. In some embodiments, the head portion 152 and the discharge portion 154 of the body 150 are each made by forming the composite material around and/or inside of a mold. In such an embodiment, forming the head portion 152 and the discharge portion 154 separately from one another facilitates removal from the molds, which might otherwise be difficult if forming the body 150 in one single piece.

Referring again to FIG. 4, the head 130 is made from (e.g., is made entirely from, is made primarily from) a metal (e.g., steel, aluminum, titanium, etc.) or another material having a greater density than the composite material used in the body 150. This facilitates a lowering of the center of gravity of the mixing drum 100 and increases the stability of the mixing drum 100. By way of example, as shown in FIG. 1, the elevation of the longitudinal axis 102 places the head end 104 of the mixing drum 20 near the bottom of the concrete mixing truck 10 relative to the rest of the mixing drum 20, lowering the center of gravity of the concrete mixing truck 10. Conventional drums that use a single material throughout have consequently higher centers of gravity and lower stability when compared to the mixing drum 100. The use of composite materials in the mixing drum 100 reduces the weight of the mixing drum 100 while providing a longer working life than a comparable conventional steel drum. Weight regulations on vehicles limit the amount of concrete that can be legally carried by a concrete mixing truck. The lesser weight of the mixing drum 100 (e.g., below 2700 lbs) facilitates carrying a larger amount of concrete (e.g., 12 yd$^3$) when compared to a conventional steel drum having a larger weight (e.g., over 4000 lbs) and thus a lower allowable capacity (e.g., 11 yd$^3$).

Figure 10:
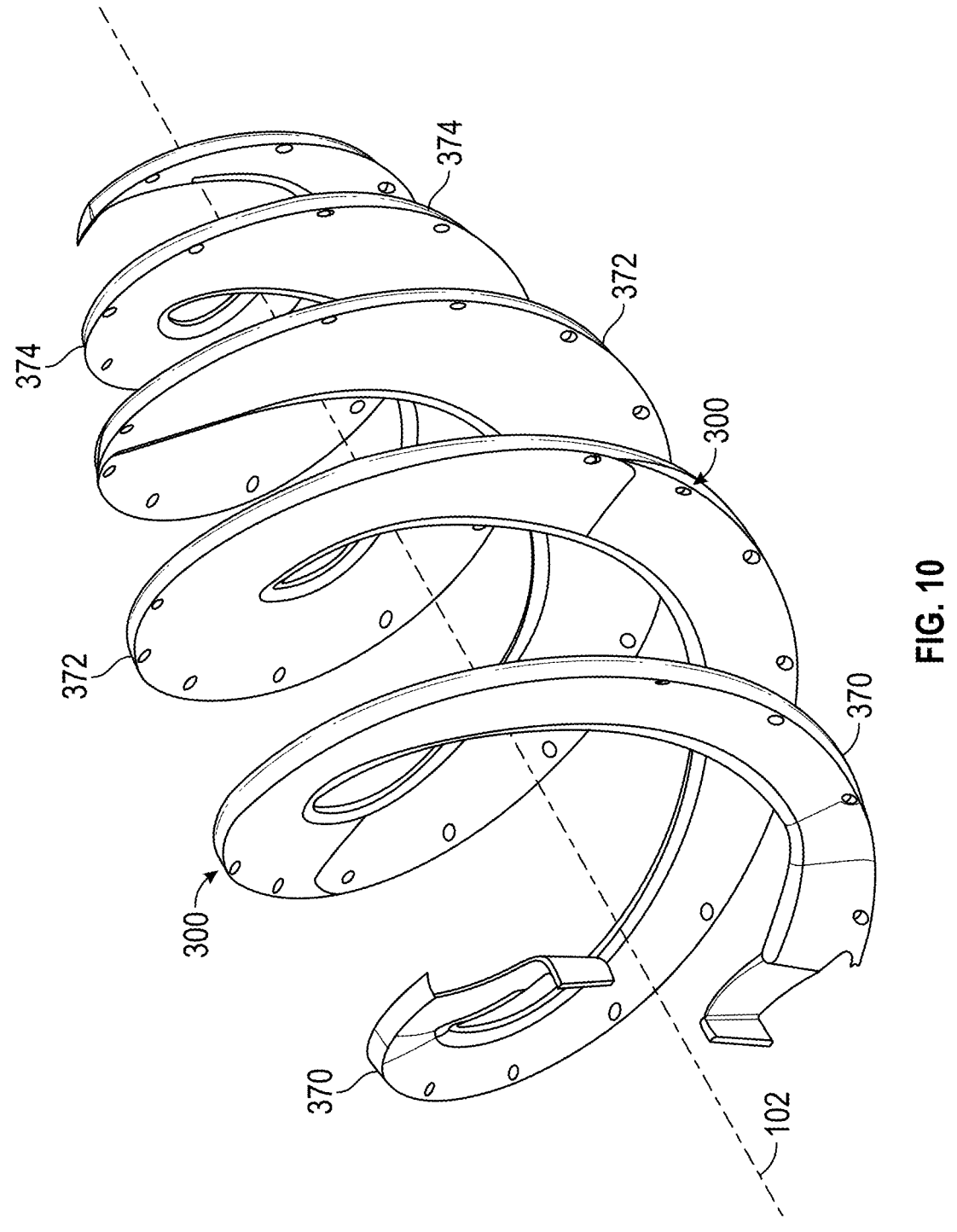
FIG. 10 is a perspective view of a pair of mixing elements of the mixing drum of FIG. 4, according to an exemplary embodiment.

Referring to FIG. 10, the mixing drum 100 includes a series of mixing elements 300. Specifically, the mixing drum 100 includes two mixing elements 300. In other embodiments, the mixing drum 100 includes more or fewer mixing elements 300. The mixing elements 300 are spiral in shape and configured to be coupled to an interior surface of the body 150. The mixing elements 300 may be identical or similar to one another and rotationally offset from one another. The mixing elements 300 each spiral in the same direction such that rotating the mixing drum 100 in a mixing direction draws the mixture in the drum towards the head end 104, and rotating the mixing drum 100 in a discharge direction draws the mixture out of the discharge aperture 232. When rotating in the mixing direction, the mixing elements 300 continuously agitate the mixture in the mixing drum 100. If the mixture is concrete, this prevents the concrete from setting. The spiral shape of the mixing elements 300 may change in slope to be a finer pitch near the discharge end 106 such that the mixing elements 300 grow closer together towards the head end 104. A cross sectional height of the mixing element 300 is defined as the distance from the point along a cross section of the mixing element 300 farthest from the longitudinal axis 102 to the point along the cross section closest to the longitudinal axis 102. The height of the mixing element 300 may vary along the length of the mixing element 300. By way of example, the height of the mixing element 300 may gradually decrease towards the discharge aperture 232.

Figure 11:
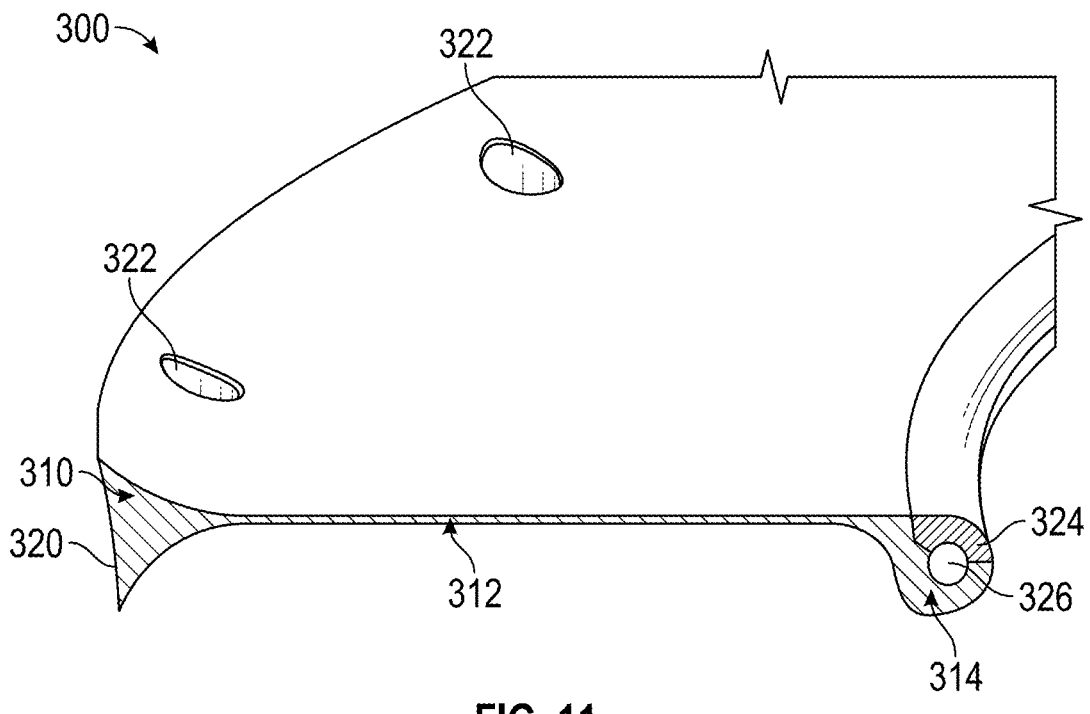
FIG. 11 is a cross sectional view of the mixing element of FIG. 10.

Referring to FIG. 11, a cross section of a mixing element 300 is shown. The mixing element 300 includes a base, shown as base section 310, a web, shown as web section 312, and a protrusion, shown as lip section 314. The web section 312 extends between the base section 310 and the lip section 314, and the base section 310 is closest to the interior surface of the body 150. A bottom surface 320 (shown to the left in FIG. 11) of the base section 310 is configured to be coupled to an interior surface of the body 150. The profiles P of the bottom surfaces 320 of the base sections 310 are shown projected onto the interior surface of the body 150 in FIG. 5. The bottom surface 320 may be curved or otherwise shaped to match the curvature of the interior surface of the body 150. The bottom surface 320 may be wider than other portions of the mixing element 300 to provide ample area with which to bond or mechanically fasten the mixing element 300 to the body 150. The base section 310 tapers from the bottom surface 320 to meet the web section 312, which is relatively thin. A series of apertures 322 extend through the base section 310 and/or the web section 312. The apertures 322 are located proximate the bottom surface 320 and extend approximately parallel to the longitudinal axis 102. The web section 312 gradually widens to meet the lip section 314. The lip section 314 is wider than the web section 312 and is disposed entirely behind a front surface of the web section 312 that faces toward the head 130. Accordingly, the lip section 314 extends beyond the web section 312 toward the discharge aperture 232. When the mixing drum 100 rotates in the discharge direction, the portion of the lip section 314 extending behind the web section 312 facilitates moving mixture towards the discharge aperture 232, as it prevents mixture moving up over the lip section 314 towards the head end 104. Because the lip section 314 does not extend forward of the web section 312, when the mixing drum 100 is rotated in the mixing direction, the mixture is free to move over the lip section 314 and onto the back side of the mixing element 300. This reduces wear on the lip section 314 from repeated contact with the mixture, which may be abrasive. In some embodiments, a portion of the lip section 314 is formed from a separate component, shown as lip guard 324. The lip guard 324 may be made from a different material than the rest of the lip section 314.

The lip guard 324 may be removable to facilitate replacement after the lip guard 324 has worn. An aperture 326 is defined in the lip section 314. The aperture 326 may extend along a portion of or the entirety of the length of the mixing element 300. The aperture 326 may facilitate lightening of the mixing element 300.

Figure 12:
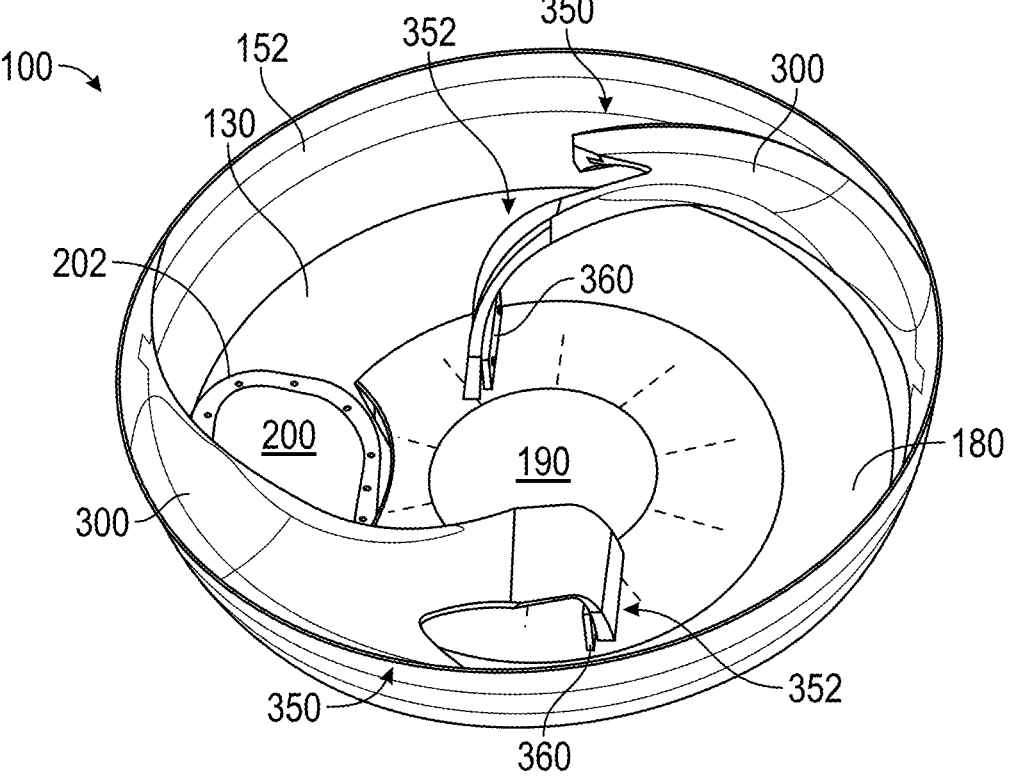
FIG. 12 is a cross sectional view of the mixing drum of FIG. 4.

Referring to FIGS. 12 and 13A, the mixing elements 300 are shown coupled to the head 130. Near the head end 104, the mixing elements 300 split into a first portion 350 that continues along the interior surface of the body 150, and a second portion 352 that bends towards the head 130. The second portion 352 terminates at the head dish 190, approximately perpendicular to the surface of the head dish 190. A pair of brackets 360 extend from the surface of the head dish 190 and are coupled (e.g., fastened) to the second portion 352, directly coupling the mixing elements 300 to the head 130. This coupling may facilitate transmission of torque from the head 130 to the mixing elements 300, lessening the load on the couplings between the mixing elements 300 and the body 150.

Referring again to FIG. 10, the mixing elements 300 are made from (e.g., are made entirely from, are made primarily from) a composite and/or polymeric material (e.g., a non-metallic material). The composite and/or polymeric material used in the mixing elements 300 may be the same as or different than the composite material used to construct the body 150. In other embodiments, the mixing elements 300 are made from different materials (e.g., steel). As shown in FIG. 10, the mixing elements 300 are each constructed in sections: a head section 370, a middle section 372, and a discharge section 374. Each section may be made from the same or a different material. Forming each section separately may facilitate manufacturing of the mixing elements 300 in a series of relatively simple pieces, as opposed to one complex piece that forms the entire mixing element 300. Referring to FIG. 10, the sections are coupled to one another at joints where the sections overlap. In other embodiments, the mixing elements 300 are made from more or fewer sections (e.g., one section, four sections, etc.).

Referring to FIGS. 4, 5, and 10, during assembly, the various components of the mixing drum 100 may be removably coupled (e.g., bonded, mechanically fastened, etc.) using adhesive or fasteners. The connecting flange 210 of the head 130 may be directly removably coupled to the head portion 152 of the body 150. The connecting flange 220 and the protrusions 226 of the head portion 152 of the body 150 may be directly removably coupled to the connecting flange 222 of the discharge portion 154. The head section 370 and the middle section 372 of each mixing element 300 may be directly removably coupled. The middle section 372 and the discharge section 374 of each mixing element 300 may be directly removably coupled. The bottom surface 320 of each mixing element 300 may be directly removably coupled to an interior surface of the body 150. The head sections 370 may be directly removably coupled to the brackets 360. The interface member 254 may be directly removably coupled to an exterior surface of the discharge portion 154.

To directly removably couple the components, the components may be bonded, mechanically fastened, or otherwise removably coupled at a joint. To bond components together, adhesive may be spread between components and/or over components. By way of example, adhesive may be spread between the bottom surface 320 of the mixing element and the interior surface of the body 150. Additionally or alternatively, adhesive may be spread over the exterior surfaces of the base section 310 of the mixing element 300 and the interior surface of the body 150. By way of yet another example, adhesive may be spread between the surfaces of the connecting flange 210 of the head 130, the inner layer 240, and the outer layer 242. In some embodiments, the overlapping surface area between surfaces where the adhesive is spread is maximized to improve the strength of the bonds. To mechanically fasten components together, any form of fastener may be used (e.g., bolts, rivets, pins, etc.). In some embodiments, both adhesive and mechanical fastening are used to couple two components together. In some embodiments, the head 130 is coupled to the head portion 152 of the body 150, and/or the head section 370, the middle section 372, and the discharge section 374 of the mixing element 300 are coupled together prior to coupling the head portion 152 to the discharge portion 154 of the body 150.

The joining method used to couple the various components together may be removable without damaging the components. By way of example, the adhesive may be a thermoplastic such that the adhesive may be heated to a softening point (corresponding to a temperature), and the sections may be pulled apart. In some such embodiments, the adhesive is selected such that it has a softening point below the melting point of the components being bonded or below the softening point of the binding agent used to form the components being bonded. Use of a removable adhesive facilitates disassembly of the mixing drum 100 for repair or replacement, increasing the working life of the mixing drum 100 when compared to conventional drums. By way of example, the bonds between the mixing element 300 and the body 150 may be removed, and the mixing element 300 can be removed to facilitate service or replacement. Additionally, the coupling arrangement of the mixing elements 300 facilitates the use of different mixing elements with the same body and head. By way of example, the mixing element 300 may be customized for a specific application (e.g., for use with a specific type of mixture) without changing the body 150 or the head 130. By way of another example, the mixing drum 100 may exchange a mixing element customized for one application for a mixing element customized for another application without exchanging the body 150 or the head 130. In such an example, the first mixing element is decoupled from the body 150 and the head 130, and another mixing element is removably coupled to the body 150 and the head 130. Further, the coupling arrangement of the mixing elements 300 facilitates the use of mixing elements 300 having a different material than the body 150. By way of example, a mixing element 300 may be made from steel while still bonding to a body made from composite. Conventionally, the mixing element would be welded to the body, requiring the mixing element and the body to be made from the same material.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:

1. A mixing drum comprising:
   a body defining a discharge aperture, the body including an inner layer defining an interior surface of the body and an outer layer defining an exterior surface of the body;
   a head coupled to the body opposite the discharge aperture, the head including a connecting flange extending between the inner layer and the outer layer of the body, wherein the head and the body define a volume; and a mixing element positioned within the volume and coupled to the body.

2. The mixing drum of claim 1, wherein the head is made from a first material, wherein the body is made from a second material that is not present in the head, and wherein the first material has a greater density than the second material.

3. The mixing drum of claim 2, wherein the first material is a metal and wherein the second material is at least one of a composite or a polymeric material.

4. The mixing drum of claim 1, wherein the mixing element is removably coupled to the body such that the mixing element can be removed from the volume.

5. The mixing drum of claim 4, wherein the mixing element is directly removably coupled to both the body and the head.

6. The mixing drum of claim 5, wherein the mixing element includes a base section, a lip section, and a web section extending between the base section and the web section, wherein the base section is positioned between the web section and the body, and wherein the base section and the lip section are wider than the web section.

7. The mixing drum of claim 6, wherein the mixing drum is configured to rotate about a longitudinal axis, wherein the lip section extends longitudinally beyond the web section toward the discharge aperture.

8. The mixing drum of claim 7, wherein the web section has a front surface that faces toward the head, and wherein the lip section is positioned entirely behind the front surface.

9. A mixing drum, comprising:

a body defining a head aperture and a discharge aperture opposite the head aperture, the body including an inner layer defining an interior surface of the body and an outer layer defining an exterior surface of the body, the body including a first material;

a head coupled to the body and positioned such that the head extends across the head aperture, the head including a connecting flange extending between the inner layer and the outer layer of the body, the head including a second material different from the first material, wherein the head and the body define a volume;

a mixing element positioned within the volume and coupled to the body, wherein a density of the second material is greater than a density of the first material; and wherein at least one of (a) the first material is not present in the head or (b) the second material is not present in the body.

10. The mixing drum of claim 9, wherein the first material is not present in the head.

11. The mixing drum of claim 9, wherein the second material is not present in the body.

12. The mixing drum of claim 9, wherein the first material is not present in the head and the second material is not present in the body.

13. The mixing drum of claim 12, wherein the first material is at least one of a composite or a polymeric material, and wherein the second material is a metal.

14. The mixing drum of claim 9, wherein the interior surface of the body defines the volume, wherein the mixing element includes a mounting surface extending along the interior surface, and wherein the mixing element is removably coupled to the body.

15. A mixing drum, comprising:

a body defining a head aperture and a discharge aperture opposite the head aperture, the body including an inner layer defining an interior surface of the body and an outer layer defining an exterior surface of the body, the body including:

a first section including a protrusion; and a second section defining a recess that receives the protrusion;

a head coupled to the body and positioned such that the head extends across the head aperture, the head including a connecting flange extending between the inner layer and the outer layer of the body, wherein the head and the body define a volume; and a mixing element positioned within the volume and coupled to the body.

16. The mixing drum of claim 15, wherein the first section defines one of the head aperture or the discharge aperture, and wherein the second section defines the other of the head aperture or the discharge aperture.

17. The mixing drum of claim 15, wherein the first section defines a first connecting flange, wherein the second section defines a second connecting flange, and wherein the first connecting flange overlaps the second connecting flange.

18. The mixing drum of claim 17, wherein the first connecting flange is a first annular flange, wherein the second connecting flange is a second annular flange, and wherein the second annular flange is received within the first annular flange.

19. The mixing drum of claim 17, wherein the protrusion extends outward from a distal end of the first connecting flange.

20. The mixing drum of claim 15, wherein a longitudinal axis extends through the head aperture and the discharge aperture, and wherein the protrusion is configured to limit rotation of the first section relative to the second section about the longitudinal axis.

* * * * *